(12) United States Patent
Briggs et al.

(10) Patent No.: US 6,310,413 B1
(45) Date of Patent: *Oct. 30, 2001

(54) STEERING MAGNETS TO REDUCE MAGNETIC LEAKAGE FLUX IN A DISK DRIVE

(75) Inventors: John C. Briggs; Allen T. Bracken, both of Layton, UT (US)

(73) Assignee: Iomega Corporation, Roy, UT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/881,803

(22) Filed: May 30, 1997

(51) Int. Cl.[7] ....................................................... G11B 5/11
(52) U.S. Cl. ........................... 310/13; 360/78.13; 360/106
(58) Field of Search ........................ 310/12, 13; 360/105, 360/106, 78.13; 335/296, 302, 306

(56) References Cited

U.S. PATENT DOCUMENTS

| | | | |
|---|---|---|---|
| 4,080,542 | * 3/1978 | De Graffenried | 310/159 |
| 4,504,879 | 3/1985 | Toldi et al. | 360/105 |
| 4,663,677 | 5/1987 | Griffith et al. | 360/71 |
| 4,663,682 | 5/1987 | McNeil | 360/105 |
| 4,683,506 | 7/1987 | Toldi et al. | 360/105 |
| 4,722,012 | 1/1988 | Toldi et al. | 360/97 |
| 4,740,851 | 4/1988 | Jones et al. | 360/97 |
| 4,787,000 | 11/1988 | Schulze | 360/105 |
| 4,811,143 | 3/1989 | Ohashi et al. | 360/105 |
| 4,901,173 | 2/1990 | Jones et al. | 360/99.04 |
| 4,965,685 | 10/1990 | Thompson et al. | 360/97.01 |
| 5,027,241 | 6/1991 | Hatch et al. | 360/105 |
| 5,124,865 | 6/1992 | Atesmen et al. | 360/103 |
| 5,291,359 | 3/1994 | Wolter | 360/104 |
| 5,508,864 | 4/1996 | Briggs et al. | 360/106 |
| 5,530,607 | 6/1996 | Spendlove | 360/105 |
| 5,621,591 | 4/1997 | Rahimi et al. | 360/106 |
| 5,748,410 | * 5/1998 | Briggs et al. | 360/106 |
| 6,069,766 | * 5/2000 | Battu et al. | 360/90.7 |

FOREIGN PATENT DOCUMENTS

| | | |
|---|---|---|
| 0 383 551 A1 | 8/1990 | (EP) . |
| 2 129 186 A | 5/1984 | (GB) . |
| WO 93/08562 | 4/1993 | (WO) . |

* cited by examiner

Primary Examiner—Elvin Enad
Assistant Examiner—Judson H. Jones
(74) Attorney, Agent, or Firm—Woodcock Washburn Kurtz Mackiewicz & Norris LLP

(57) ABSTRACT

A disk drive with steering magnets that reduce the magnetic flux leakage from the actuator magnets of a linear actuator is disclosed. The steering magnets reduce flux leakage in the area of the magnetic disk where magnetic information is read and record, thereby enabling disk drive size to be reduces. The steering magnets are arranged along the sides of the outer return path. Like poles of the steering magnets face inward toward like poles of the actuator magnets.

7 Claims, 3 Drawing Sheets

STEERING MAGNETS TO REDUCE MAGNETIC LEAKAGE FLUX IN A DISK DRIVE

FIELD OF THE INVENTION

The present invention is related to disk drives for storing digital information, and more particularly, to linear actuators for use in a disk drive.

DESCRIPTION OF THE PRIOR ART

Disk drives for storing electronic information are found in a wide variety of computer systems, including workstations, personal computers, and laptop and notebook computers. Such disk drives can be stand-alone units that are connected to a computer system by cable, or they can be internal units that occupy a slot or bay in the computer system. Laptop and notebook computers have relatively small bays in which to mount internal disk drives and other peripheral devices, as compared to the much larger bays available in most workstation and personal computer housings. The relatively small size of peripheral bays found in laptop and notebook computers can place significant constraints on the designer of internal disk drives for use in such computers. Techniques that address and overcome the problems associated with these size constraints are therefore important.

Disk drives of the type that accept removable disk cartridges have become increasingly popular. One disk drive product that has been very successful is the ZIP™ drive designed and manufactured by Iomega Corporation, the assignee of the present invention. ZIP™ drives accept removable disk cartridges that contain a flexible magnetic storage medium upon which information can be written and read. The disk-shaped storage medium is mounted on a hub that rotates freely within the cartridge. A spindle motor within the ZIP™ drive engages the cartridge hub when the cartridge is inserted into the drive, in order to rotate the storage medium at relatively high speeds. A shutter on the front edge of the cartridge is moved to the side during insertion into the drive, thereby exposing an opening through which the read/write heads of the drive move to access the recording surfaces of the rotating storage medium. The shutter covers the head access opening when the cartridge is outside of the drive to prevent dust and other contaminants from entering the cartridge and settling on the recording surfaces of the storage medium.

The ZIP™ drive is presently available for workstations and personal computers in both stand-alone and internal configurations. In order to provide a version of the ZIP™ drive for use in laptop and notebook computers, the size constraints of the peripheral bays of such computers must be considered. In particular, for an internal drive to fit in the majority of laptop and notebook peripheral bays, the drive must be no longer than 135 mm. The height of the drive must be in the range of 12 mm to 15 mm. These dimensions place many constraints on the design of such a drive, and give rise to numerous design problems. The present invention addresses and overcomes one such problem.

Disk drives, for example the ZIP™ drive, often include an actuator assembly to carry read/write heads into engagement with an information storage disk. One type of actuator is a linear actuator that includes a coil mounted to a carriage, an magnetic flux outer return path assembly, two inner return path assembly members, and two actuator magnets that are typically bonded to opposing inner walls of the outer return path. The inner and outer return paths form a flux return path for a magnetic field generated by the magnets. The magnetic flux within the air gap between the magnets and the inner return paths induces a force on the actuator in response to an electric current in the actuator coil, thereby moving the carriage.

Unfortunately, the force generated on the actuator by the magnets and coil substantially diminishes near the ends of the air gap. These end effects may possibly be due to loss of perpendicularity of the magnetic flux relative to the magnet. Regardless of the phenomenon responsible for the end effects, conventional full-size actuator assemblies typically allow for the end effects by limiting the travel of the carriage to the area within the air gap where end effects are minimal. Such limitation on carriage travel requires a longer outer return path to provide the longer air gap. This solution to the end effect problem is feasible in full-size drives because such drives lack a constraint on overall length. However, in laptop and notebook computers such ineffective use on space is problematic. It is desirable to provide a linear actuator for a disk drive that enables the carriage to utilize a greater portion of the air gap.

The linear actuator has a related magnetic problem that is also exasperated by the trend toward smaller disk drives. Magnetic flux from the magnets cannot be confined to a given location or magnetic path because a portion of the flux naturally takes paths that are external to the magnet. The portion of the flux that leaks from the external paths is referred to as leakage or leakage flux. Magnetic leakage is troublesome in magnetic disk drives because the leakage may interfere with the recording or reading of the information, may create shifting in the timing of bits written to the disk, or may even cause bulk erasure of magnetic information.

To ensure proper operation, it is desirable to maintain a magnetic leakage flux limit of approximately 10 Gauss in the Z direction (that is, perpendicular to the plane of the disk) and 3 Gauss in the Y direction (that is, tangential to a circular track on the disk) in the area where the heads access the magnetic information. Conventional disk drives, in which overall drive length is not tightly constrained, may reach such a low level of leakage flux in the area of the magnetic information by locating the magnets far away from the disk and locating the read/write heads at the end of long actuator arms.

This nominally acceptable flux limit at the heads is significantly less than the magnetic flux present in other areas of the actuator assembly, especially near the actuator magnets. For example, the actuator magnets of the ZIP™ drive produce approximately 4,200 Gauss in the air gaps through which the coil translates. Without techniques to limit leakage outside of the return path, the 10 Gauss flux limit in the information reading area requires significant spacing between the actuator magnets and the disk, thereby limiting the potential reduction of overall size of the drive.

Because of the reduced drive length compared with larger drives, a linear actuator of laptop and notebook computer drives must be positioned significantly closer to the magnetic information on the disk. Because the magnets are affixed within the linear actuator, the magnets of these smaller drives must also be closer to the magnetic information. It is desirable to provide a device that diminishes the leakage flux from the actuator magnets in the area of the magnetic information on a magnetic disk, especially in smaller disk drives such as those of laptop and notebook computers.

The foregoing and other objects, features and advantages of the invention will become evident hereinafter.

SUMMARY

A disk drive having a pair of steering magnets that reduce the magnetic leakage flux from the actuator magnets of a linear actuator is provided. The steering magnets are located on each side of the linear actuator substantially parallel to the actuator magnets. Like poles of the steering magnets face inward toward like poles of the actuator magnets. Employing the steering magnets in this manner diminishes the magnetic flux leakage, which is especially important in the portion of the disk over which the read/write heads travel.

Because magnetic leakage flux interferes with reading and recording data, diminishing the leakage flux enables a magnetic disk to operate more closely to the actuator magnets than would otherwise be feasible. Employing the steering magnets according to the present invention therefore permits a reduction in disk drive size because flux leakage may be reduced to a level at which the read/write heads may properly perform.

DETAILED DESCRIPTION OF THE PREFERRED EMBODIMENT

Figure 1:
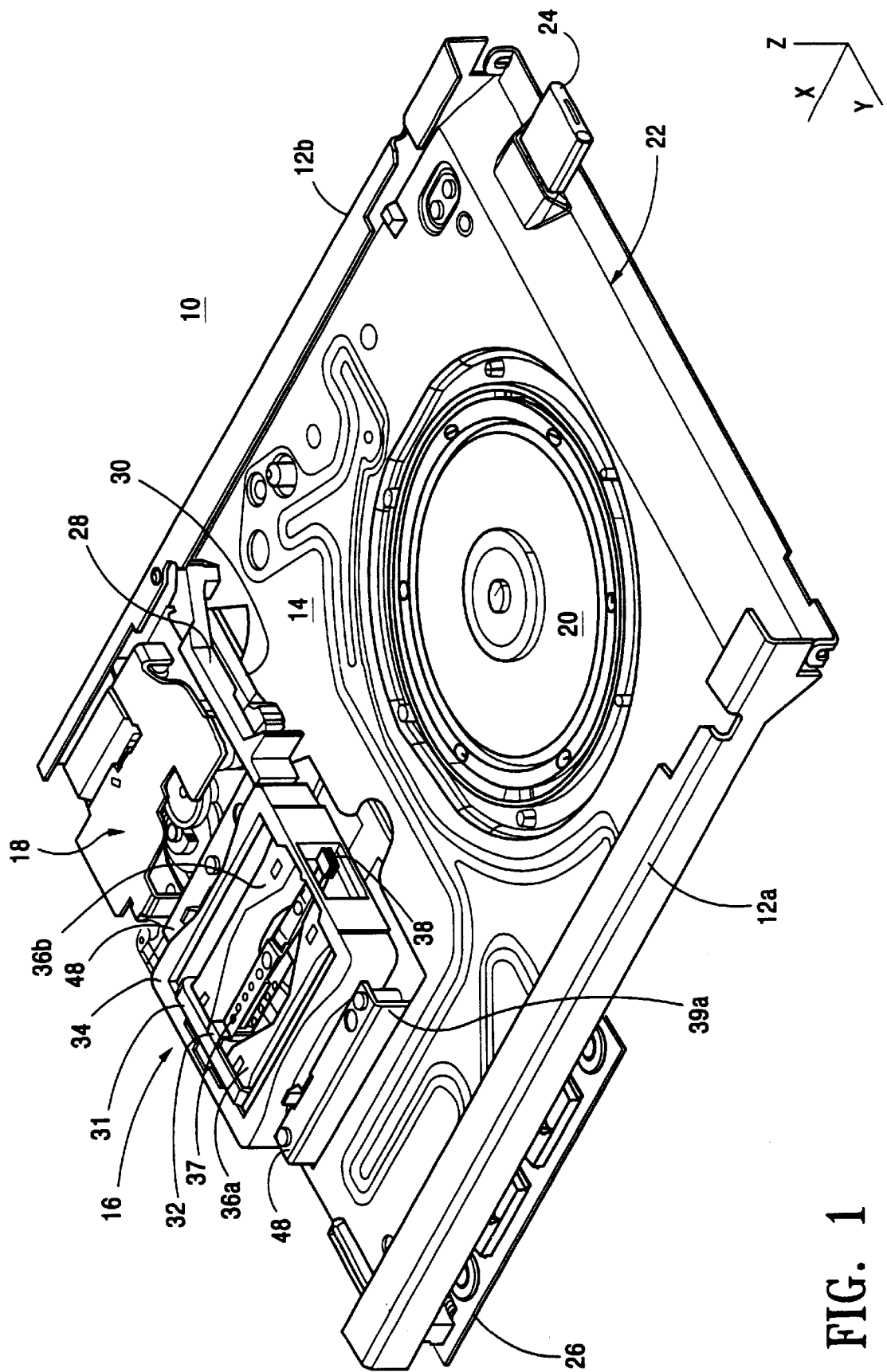
FIG. 1 is a perspective view of the disk drive of the type employing the present invention.

FIG. 1 shows an exemplary disk drive 10 in which the present invention may be employed. The disk drive 10 comprises a chassis 14 having u-shaped outer edges that form opposed guide rails 12a, 12b that guide a removable disk cartridge (not shown) into the disk drive through opening 22. In the present embodiment, the chassis is metallic. A thin metal top cover (not shown) of the disk drive 10 has been removed so that the internal components of the drive are visible.

A cartridge shutter lever 28 and an eject lever 30 are rotatably mounted on the chassis. Both levers 28 and 30 are shown in FIG. 1 in the positions that they occupy when a disk cartridge is fully inserted into the drive. During cartridge insertion, the shutter lever swings from a forward position to the position shown in FIG. 1. During this movement, an abutment surface on the shutter lever 28 engages a shutter of the disk cartridge and moves the shutter to the side, exposing a head access opening in the front peripheral edge of the cartridge. The eject lever also moves from a forward position to the position shown in FIG. 1, when the cartridge is inserted. In the position shown in FIG. 1, the eject lever is in a cocked position, under spring tension. When it is desired to eject the disk cartridge from the drive 10, an eject button 24 is pushed. Among other things, this causes the eject lever 30 to be released from its cocked position, so that it springs forward to force the disk cartridge backwardly out of the disk drive.

The disk drive 10 also has a linear actuator 16 disposed at the rear of the chassis 14. The linear actuator 16 comprises a carriage assembly 32, an outer magnet return path assembly 34, and a first and second inner return path member 36a and 36b disposed on opposite sides of the carriage assembly 32. Carriage assembly 32 includes a coil 31 and actuator arms 37, and read/write heads 38 that are disposed on a front end of actuator arms 37.

After a disk cartridge is inserted into the disk drive 10, the carriage assembly 32 carries a pair of read/write heads 38 over the recording surfaces of a disk-shaped storage medium within the cartridge. A spindle motor 20 is provided on the floor of the chassis 14. During cartridge insertion, the spindle motor 20 is translated vertically into engagement with a hub of the disk cartridge, in order to rotate the disk-shaped storage medium at a relatively high speed. A circuit board 26 is attached to the chassis 14 via a plurality of standoffs (not shown). The circuit board 26 carries the drive circuitry. A gear train mechanism 18 controls movement of the eject lever 30 and movement of a head retract mechanism (not shown) that moves the carriage assembly 32 to a parked position to prevent damage to the read/write heads 38, when the disk drive is not in use.

Figure 2:
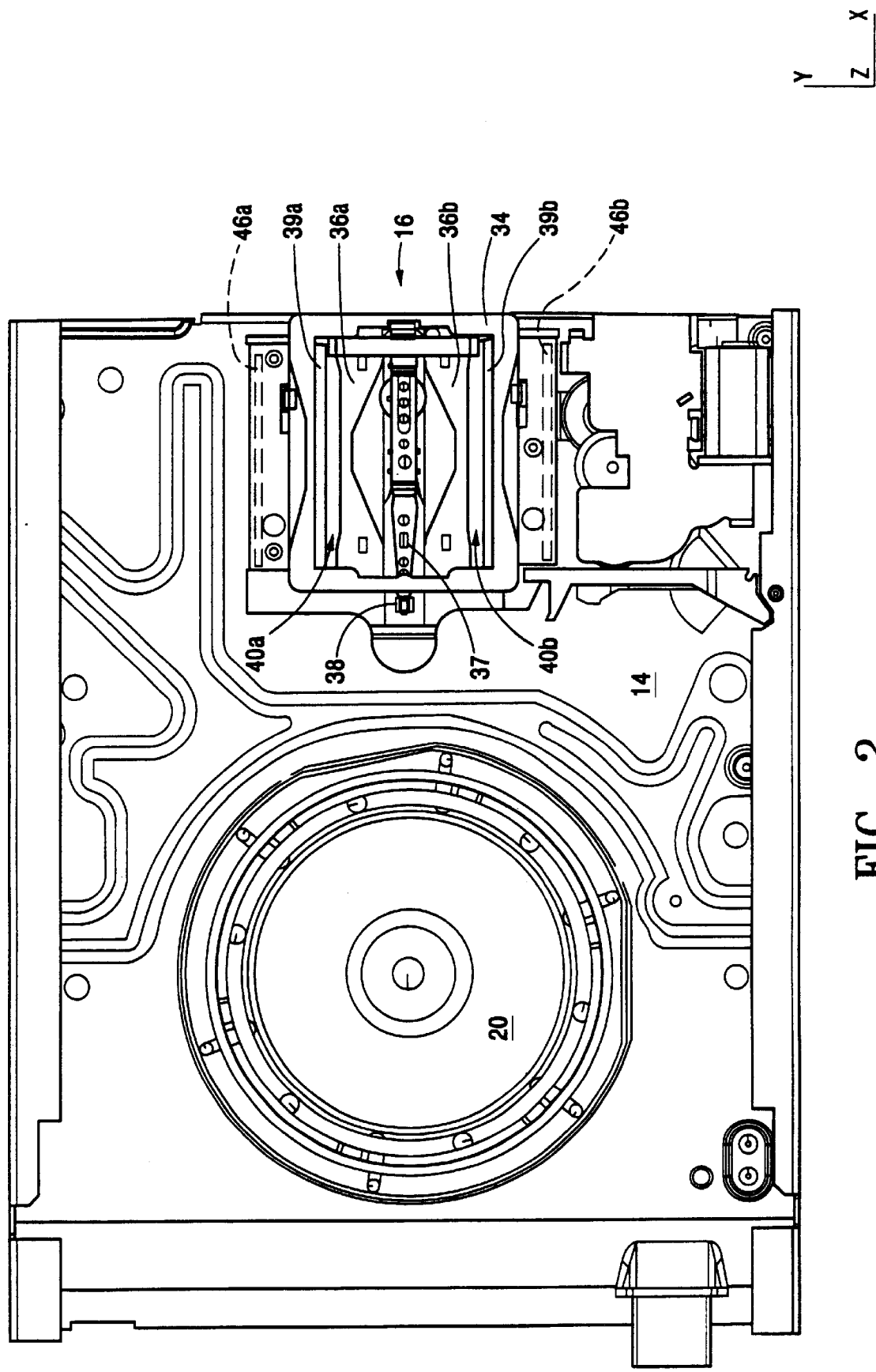
FIG. 2 is a top view with the steering magnets of the present invention shown in relief.

Referring to both FIGS. 1 and 2, outer return path 34, which forms a substantially rectangular shape (viewed from above), includes a pair of actuator magnets 39a,b. A first and second actuator magnet 39a and 39b, respectively, are coupled to opposing vertical interior sides of outer return path 34 substantially parallel to a longitudinal centerline of the actuator arms 37. First and second inner return path members 36a and 36b span from a front to a rear side of outer return path 34. Co-pending applications U.S. application Ser. No. 08/749,999, filed Nov. 15, 1996, and U.S. application Ser. No. 08/881,805, filed May 30, 1997, entitled "Laminated Steel Return Path with Actuator Support Features", each of which is incorporated herein by reference in its entirety, describe a preferred embodiment of the outer return path 34 and inner return path members 36a and 36b.

Inner return path members 36a and 36b have an outboard surface that faces actuator magnets 39a and 39b, respectively, to form a respective air gap 40a and 40b. Each actuator magnet 39a,b has opposing poles, designated as N and S in FIG. 3. For proper carriage actuation, like poles in actuator magnets 39a and 39b face outward in a direction approximately perpendicular to carriage travel.

Figure 3:
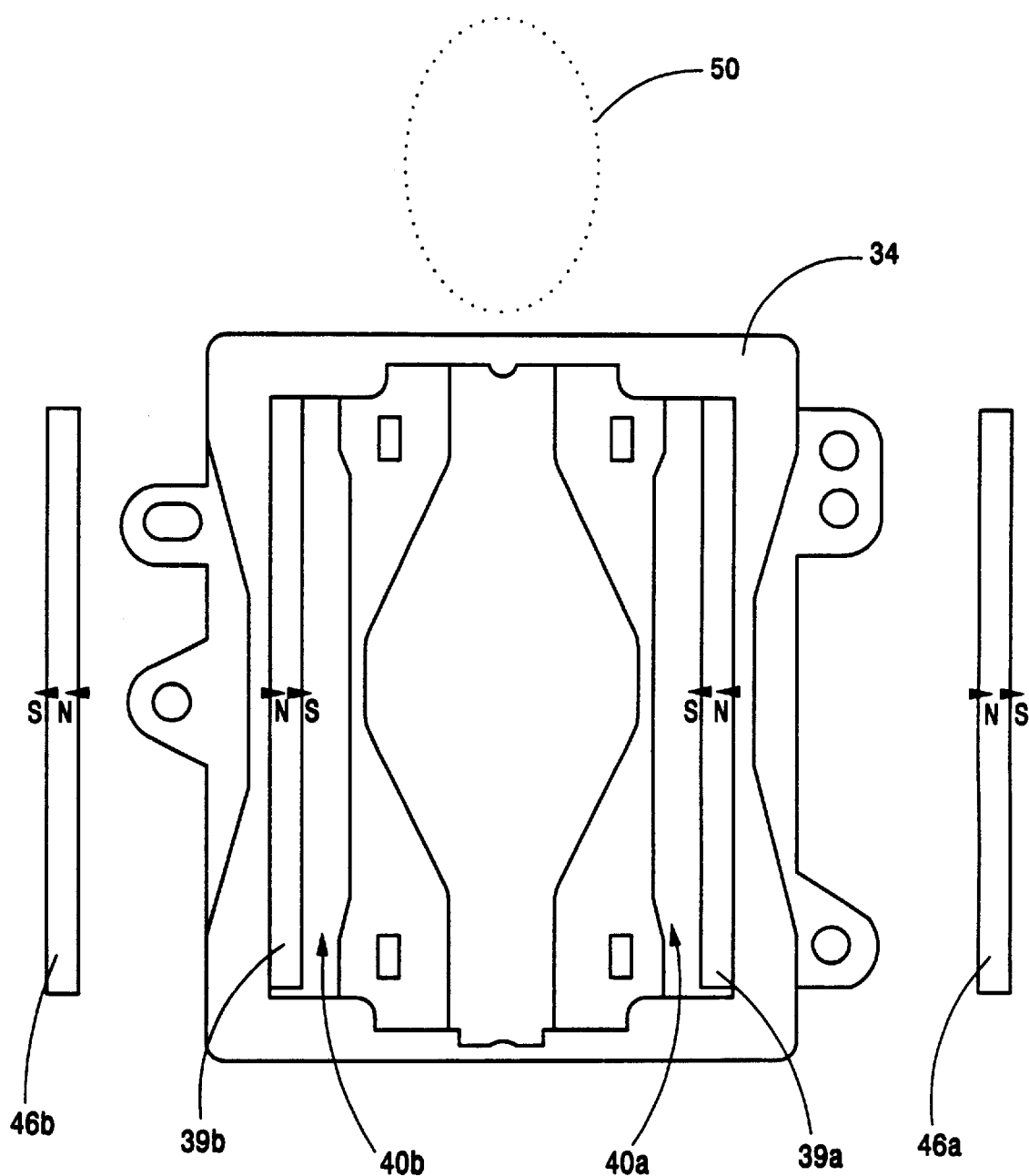
FIG. 3 is a top view of the linear actuator showing he steering magnets with the remainder of the drive removed for clarity.

According to the present invention, disk drive 10 includes two steering magnets 46a and 46b disposed along the sides of outer return path 34, but next to vertical structural member 48 disposed on chassis 14, as shown in FIG. 2 (in relief) and in FIG. 3. Each steering magnet 46a and 46b is preferably held by structural member 48 to chassis 14. FIG. 3 also shows the disk portion 50 in which it is desired to reduce leakage flux. Disk portion 50 roughly corresponds to the area over which the read/write heads 38 travel.

Steering magnets 46a and 46b are oriented with like poles facing inward toward outer return path 34. To obtain the desired reduction in leakage flux, the inward facing poles of steering magnets 46a,b have the same polarity as the outward facing poles of actuator magnets 39a,b. In the embodiment shown in FIG. 3, the facing poles of the steering magnets 46a,b and actuator magnets 39a,b is the N pole.

A drawback of employing the present invention is that the steering magnets 46a,b may reduce the magnetic flux within the gaps 40a,b. Because actuator operation depends on the flux within these gaps 40a,b, symmetry about the actuator travel centerline is preferred. Thus, it is preferred for a first steering magnet 46a and a second steering magnet 46b to produce nearly identical magnetic fields at nearly identical and opposite spacings from outer return path 34.

Preferably, the length of steering magnets 46a,b approximately equals the length of actuator magnets 46a,b. In the exemplary drive shown in FIG. 1, the steering magnets 46a,b are approximately 29 mm long. However, this length is provided only for illustration purposes. The shape, location, and strength of steering magnets 46*a,b* will depend on linear actuator parameters including actuator magnet strength, desired magnetic flux within gaps 40*a,b,* the amount of surrounding magnetically permeable material, and the desired amount of reduction in the leakage flux, as will be understood by those familiar with such parameters.

In the preferred embodiment, it is believed that the steering magnets 46*a,b* produce a magneto motive force potential on the steel chassis 14 of sufficient magnitude and polarity that the leakage flux from the actuator 16 is not sufficiently driven through the chassis 14 and therefore not through to the read/write heads 38. Although it is believed that the magneto motive force potential induced by the steering magnets is responsible for the reduction in leakage flux in the disk portion 50, it is understood that the present invention is not limited thereto.

It is further understood that changes may be made to the embodiments described above without departing from the broad inventive concepts thereof. Accordingly, the present invention is not limited to the particular embodiments nor to the theoretical description disclosed, but is intended to cover all modifications that are within the spirit and scope of the invention as defined by the appended claims.

What is claimed is:

1. A disk drive comprising a suspension including at least one read/write head and a linear actuator for positioning the read/write head, the actuator including a coil, a magnetic flux outer return path, at least one actuator magnet coupled to the outer return path for electromagnetically cooperating with said coil, and at least one steering magnet located proximate the at least one of the actuator magnets for diminishing the magnetic flux leakage from the actuator magnets in the area of the read/write head.

2. The disk drive of claim 1 wherein the at least one steering magnet comprises a first steering magnet and a second steering magnet, said first steering magnet being disposed on an opposing side of the outer return path from said second steering magnet.

3. The disk drive of claim 1 wherein each one of the at least one steering magnet and each one of the at least one actuator magnet are disposed substantially mutually parallel.

4. The disk drive of claim 1 wherein the at least one steering magnet has a pole facing a like pole of the corresponding actuator magnet.

5. The disk drive of claim 2 wherein the first steering magnet has a pole facing a like pole of a first actuator magnet, and wherein the second steering magnet has a pole facing a like pole of a second actuator magnet.

6. A method for diminishing magnetic leakage flux from an actuator in a disk drive, comprising the steps of:

providing an actuator having at least one actuator magnet that produces a magnetic leakage flux in an area for reading and recording information on a disk by read/write heads; and providing at least one steering magnet having a pole that faces a like pole of the at least one actuator magnet, the steering magnet being located for diminishing said magnetic flux leakage from the at least one actuator magnet.

7. The method of claim 6 wherein the step of providing a linear actuator having at least one actuator magnet comprises the step of providing a linear actuator having two actuator magnets, each one of the two actuator magnets having a like pole facing outward from the linear actuator; and wherein the step of providing at least one steering magnet comprises the step of providing two steering magnets, one of the two steering magnets disposed proximate one of the actuator magnets, an other one of the steering magnets disposed proximate an other one of the actuator magnets, each one of the two steering magnets having a like pole facing a like pole of the actuator magnet.

* * * * *